US012320651B2

(12) United States Patent
Thomas et al.

(10) Patent No.: US 12,320,651 B2
(45) Date of Patent: Jun. 3, 2025

(54) LOCALIZATION FUNCTIONAL SAFETY

(71) Applicant: Motional AD LLC, Boston, MA (US)

(72) Inventors: Stephen L. Thomas, Cheswick, PA (US); Chaitanya Shinde, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 247 days.

(21) Appl. No.: 18/095,020

(22) Filed: Jan. 10, 2023

(65) Prior Publication Data

US 2023/0236022 A1 Jul. 27, 2023

Related U.S. Application Data

(60) Provisional application No. 63/303,301, filed on Jan. 26, 2022.

(51) Int. Cl.
*G01C 21/30* (2006.01)
*B60W 60/00* (2020.01)
*G06T 7/70* (2017.01)

(52) U.S. Cl.
CPC ......... *G01C 21/30* (2013.01); *B60W 60/0015* (2020.02); *G06T 7/70* (2017.01); *B60W 2556/40* (2020.02); *B60W 2556/45* (2020.02); *G06T 2207/10028* (2013.01); *G06T 2207/30248* (2013.01)

(58) Field of Classification Search
CPC .............. G01C 21/30; B60W 60/0015; B60W 2556/45; B60W 2556/40; G06T 7/70; G06T 2207/30248; G06T 2207/10028
USPC ........................................................ 701/445
See application file for complete search history.

(56) References Cited

U.S. PATENT DOCUMENTS

| 11,307,295 | B1* | 4/2022 | Toshniwal | .............. G01S 17/89 |
| 11,741,631 | B2* | 8/2023 | Serackis | ................. G06T 7/251 |
| | | | | 382/100 |
| 11,879,997 | B2* | 1/2024 | Zweigle | ................ G06T 7/0008 |
| 2019/0049242 | A1 | 2/2019 | Adams et al. | |
| 2021/0300405 | A1 | 9/2021 | Hyde et al. | |

(Continued)

FOREIGN PATENT DOCUMENTS

| CN | 109270545 | 1/2019 |
| KR | 2021-0100777 A | 8/2021 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Andrew Joseph Rudy
(74) *Attorney, Agent, or Firm* — Fish & Richardson P.C.

(57) ABSTRACT

Provided are methods for localization functional safety, which can include systems, methods, and computer program products are also provided. In examples, a method includes applying a transform to a source point cloud and calculating a second metric based on the application of the transform to the source point cloud and a map at a higher ASIL level. A first metric is determined based on a localization function that executes at a lower ASIL level. A deviation between a first metric and the second metric, is determined wherein the vehicle localization is validated when the deviation is less than a predetermined threshold.

20 Claims, 8 Drawing Sheets

(56) References Cited

U.S. PATENT DOCUMENTS

2021/0370968 A1 12/2021 Xiao et al.
2022/0236388 A1* 7/2022 Toshniwal .............. G01S 17/32

OTHER PUBLICATIONS

International Electrotechnical Commission (IEC) 61508, "Functional safety of electrical/electronic/programmable electronic safety-related systems," Apr. 2010, 4 pages (Abstract Only).
International Organization for Standardization (ISO) 26262—"Functional Safety for Road Vehicles," Dec. 2018, 3 pages (Abstract Only).

* cited by examiner

LOCALIZATION FUNCTIONAL SAFETY

CROSS-REFERENCE TO RELATED APPLICATION

This application claims the benefit of U.S. Provisional Application No. 63/303,301 filed on Jan. 26, 2022, which is incorporated by reference herein in its entirety.

BACKGROUND

Localization refers to a process of an autonomous vehicle determining its location, including a position and orientation. Localization is established using a representation of the environment, where the autonomous vehicle interprets that representation along with other data to determine its position and orientation as it relates to the representation. The vehicle navigates through the environment using the position and orientation determined from localization.

DETAILED DESCRIPTION

Figure 1:
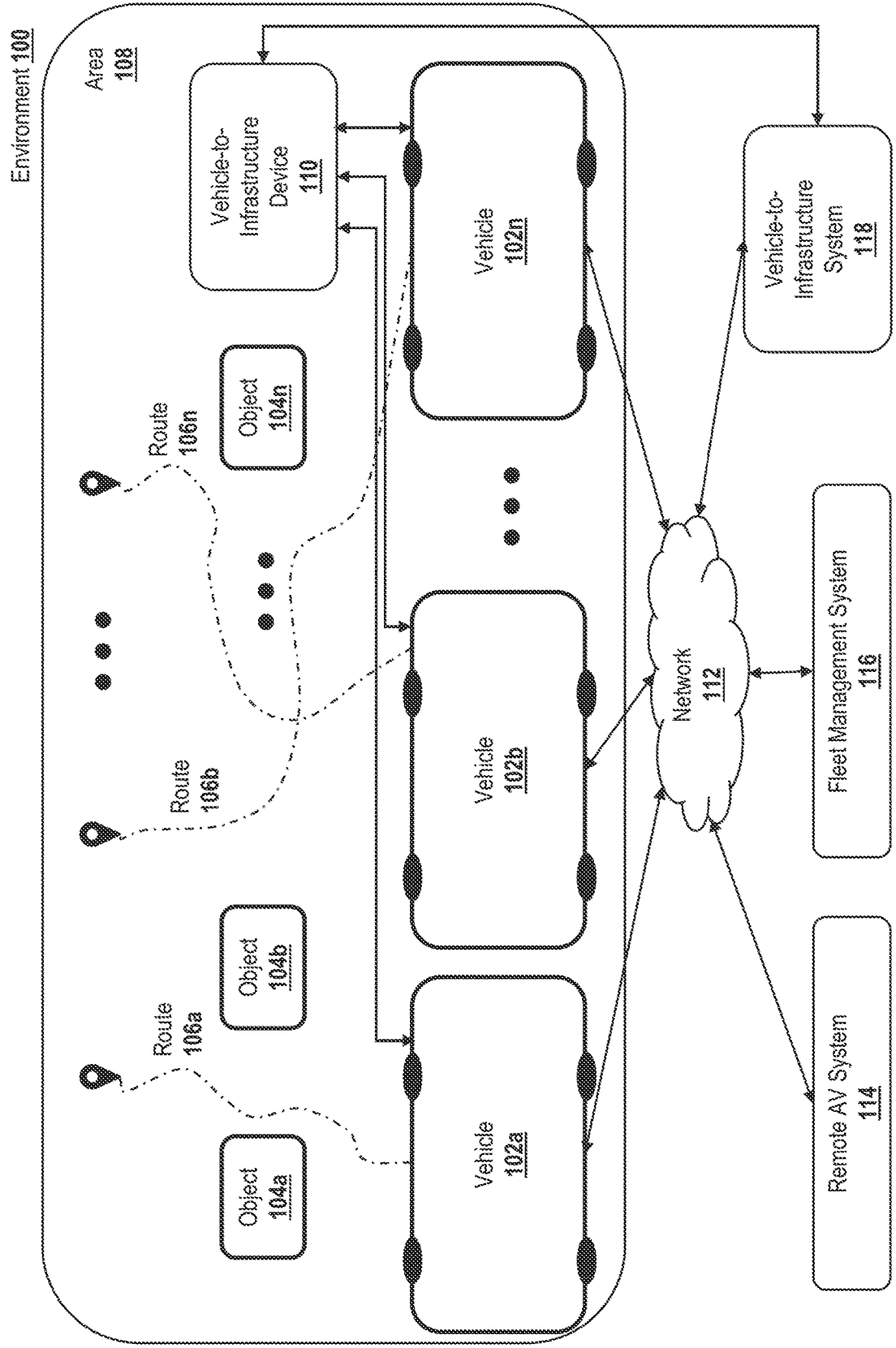
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement localization functional safety. A vehicle (such as an autonomous vehicle) establishes its position and orientation through localization. Localization is based on a representation of the environment, wherein the vehicle interprets the representation of the environment and other data to determine its position and orientation. Source point cloud data is iteratively processed to calculate a transformation between the point cloud and a map. A rotation matrix and transformation vector are used to calculate a pose of the vehicle based on a transform calculated from the iterative localization. Localization also computes a first metric associated with the calculated pose. The transform is applied to the source point cloud data and a second metric is calculated based on the transform as applied to the source point cloud data and the map point cloud. In some embodiments, the second metric is calculated using hardware and software that is independent from the hardware and software used to compute the first metric. A deviation between the first metric and the second metric is determined. The localization is validated when the deviation is within a predetermined threshold.

By virtue of the implementation of systems, methods, and computer program products described herein, techniques for localization functional safety enable a quicker evaluation of functional safety requirements. Indeed, some of the advantages of these techniques include satisfying functional safety requirements. The checker as described herein is lightweight (e.g., without iterative computations or large storage requirements) to enable execution using processors with limited computational power and a higher automotive safety integrity level (ASIL-B processors or higher). In examples, the checker is external to other, more complex AV functionality. In this manner, the present techniques enable AV functionality that satisfies a higher automotive safety integrity level than the underlying hardware by checking the output of the AV functionality using the checker. Accordingly, the AV functionality satisfies a higher automotive safety integrity level without a redesign of the AV software stack to operate using hardware at the higher automotive safety integrity level.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
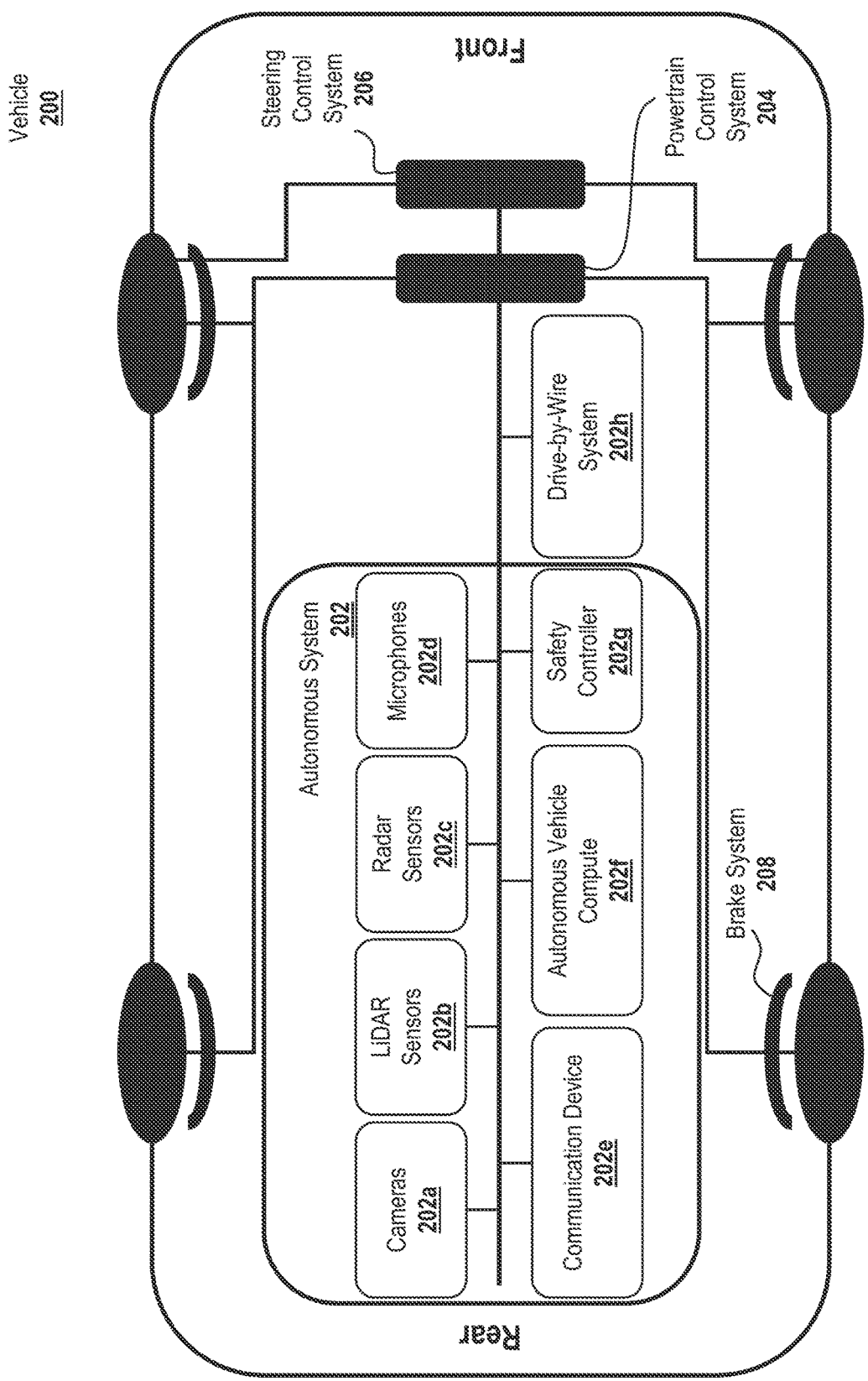
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
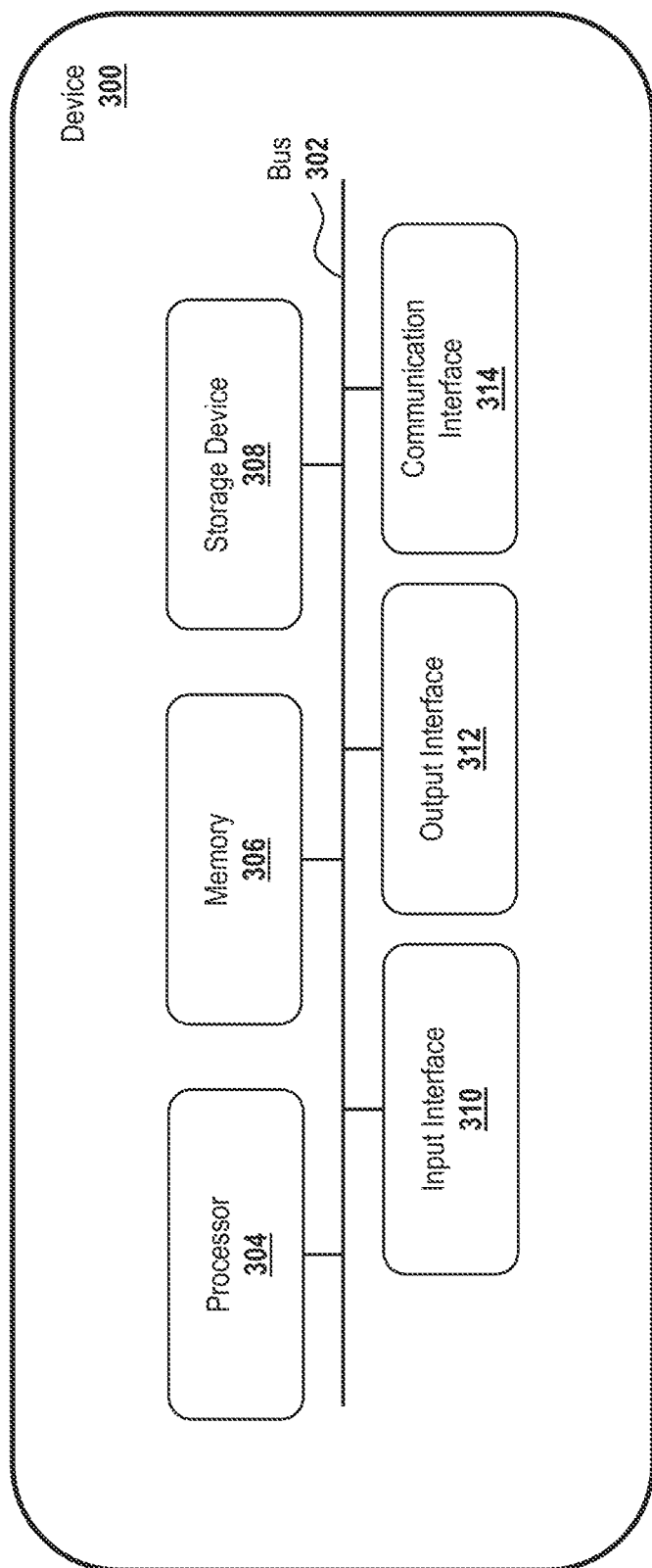
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
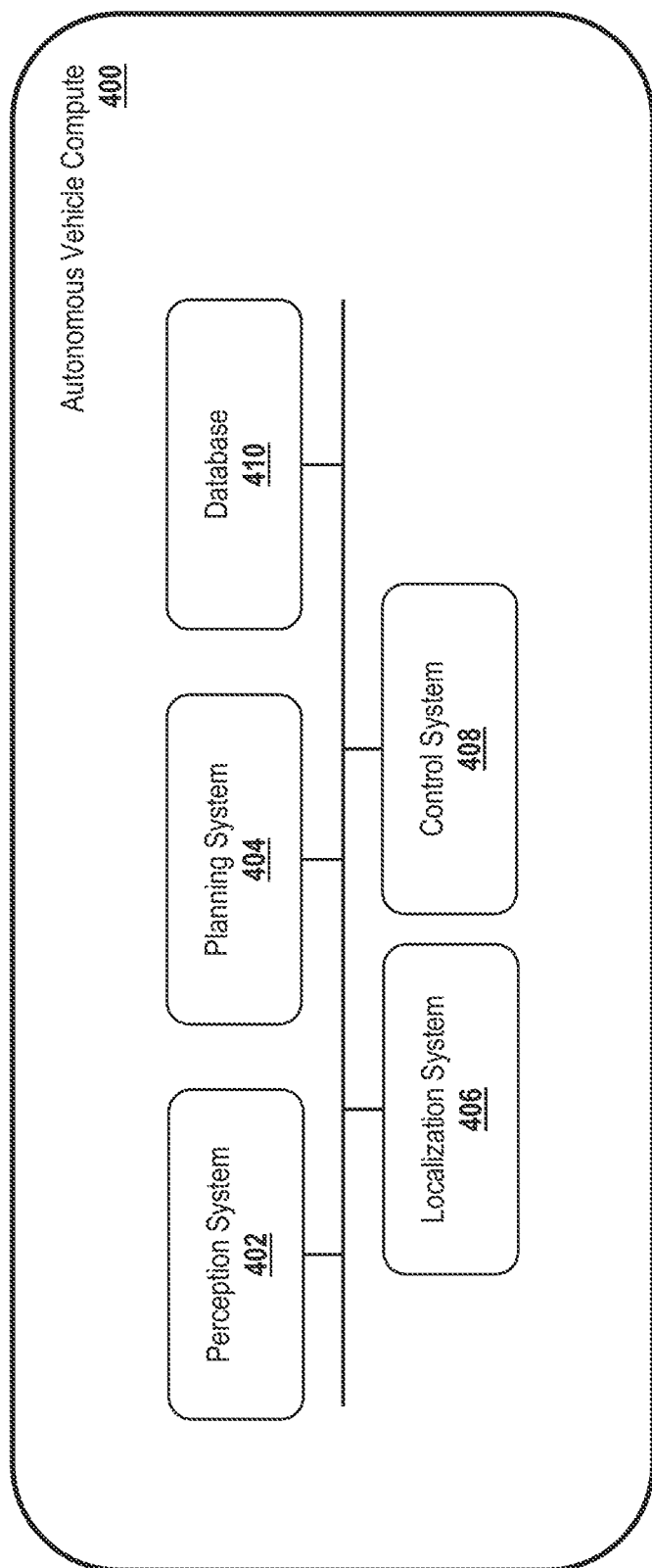
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map point cloud. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map point cloud is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
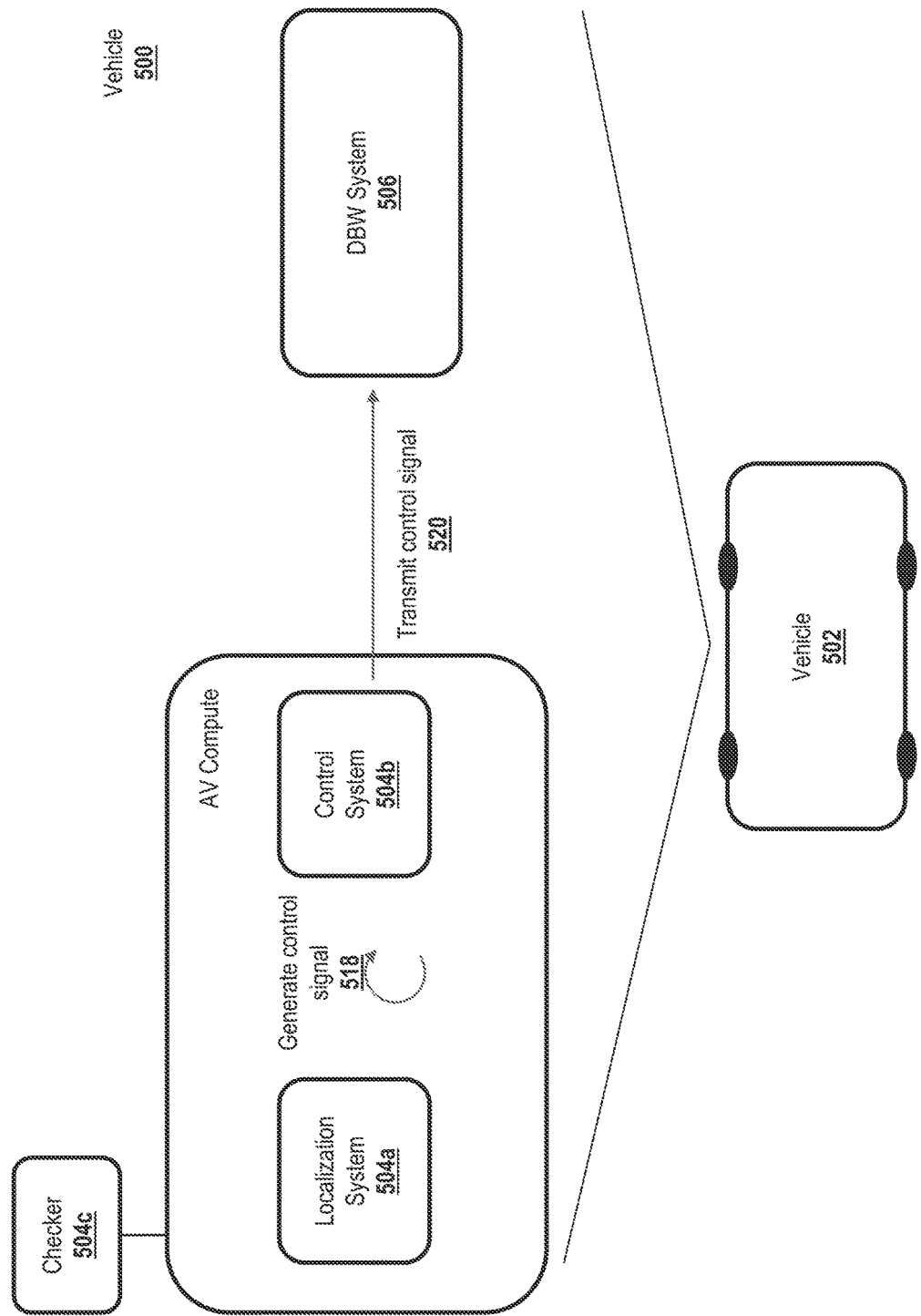
FIG. 5 is a diagram of an implementation of a process for localization functional safety.

Referring now to FIG. 5, illustrated are diagrams of an implementation 500 of a process for localization functional safety. In some embodiments, implementation 500 includes localization system 504a, control system 504b, and a checker 504c. The localization system 504A and the control system 504b may be, for example, the localization system 406 and the control system 408, respectively. In some embodiments, the localization system 504a determines a location of the AV. The location is used, at least in part, to generate an control signal 518 at a control system 504b. The control system 504b transmits the control signal 520 to the DBW system 506. The DBW system enables movement of the vehicle 502 in accordance with the transmitted control signal 520. In some embodiments, the checker 504c is implemented by one or more systems separate from the AV compute of vehicle 502. Additionally, or alternatively, the checker 504c can be implemented by one or more systems included in the AV compute of vehicle 502. In some embodiments, the AV compute of vehicle 502 is the same as, or similar to, the AV compute 400 illustrated in FIG. 4. In some examples, the checker 504c is implemented in a remote AV system, such as the remote AV system 114 illustrated in FIG. 1.

Generally, an AV employs a localization function (e.g., localization system 406, localization system 504a) to determine the AV position and orientation. In some embodiments, localization is a safety critical function. For example, for a level 4 or higher-level AV, localization is a safety critical function. The AV level represents a level of automation associated with the AV, and is described in SAE International's standard J3016: Taxonomy and Definitions for Terms Related to On-Road Motor Vehicle Automated Driving Systems. The levels define one or more driving automation features that are engaged in any given instance of on-road operation of a vehicle. As such, although a given vehicle may be equipped with a driving automation system that is capable of delivering multiple driving automation features that perform at different levels, the level of driving automation exhibited in any given instance is determined by the features that are currently active (e.g., engaged) at a particular vehicle.

A safety critical function is a function whose failure to operate or incorrect operation may directly result in a total failure of the AV or hazardous behavior of the AV. In examples, a safety critical function includes a system whose failure or malfunction can impact safety. Validation refers to checking or proving the accuracy of a result. For example, validation evaluates an output of an AV system to determine if the output is close to an expected output of the AV system in view of the input. In some embodiments, validation outputs a determination that an AV system satisfies operational requirements according to one or more predefined standards. Satisfying operational requirements as set by predefined standards can provide direct evidence of meeting statutory or other predetermined requirements.

Safety critical functions are validated to determine if the underlying hardware and software associated with the safety critical function operate according to the function's intended purpose. In examples, localization is validated as a safety critical function. In some embodiments, a localization function is evaluated according to an Automotive Safety Integrity Level (ASIL). ASIL is a risk classification scheme defined by the International Organization for Standardization (ISO) 26262—"Functional Safety for Road Vehicles". This is an adaptation of the Safety Integrity Level (SIL) used in the International Electrotechnical Commission (IEC) 61508 standard for the automotive industry. In some examples, in order for an autonomous vehicle compute system and autonomous vehicle to be considered sufficiently safe to operate on roadways among the general population, or for components or subsystems of the autonomous vehicle to be considered safe enough to be implemented in such autonomous vehicles, the systems and components must satisfy certain safety standards and regulations (e.g., according to ASIL standards), among other examples.

The ASIL is established by performing a risk analysis of a potential hazard by looking at the severity, exposure, and controllability of the vehicle operating scenario. The safety goal for that hazard in turn carries the ASIL levels. There are four ASIL levels (collectively referred to as ASILs) identified by the standard: ASIL A, ASIL B, ASIL C, ASIL D. The highest integrity is ASIL D, which dictates the highest integrity requirements and is a most stringent grade for safety integrity. The lowest level is ASIL A, which indicates a lowest level of integrity requirements and a lowest grade for safety integrity. In examples, the ASIL is accompanied by a quality managed (QM) level. Generally, a QM level indicates that there is no need to implement additional risk reduction measures above and beyond the industry acceptable quality system.

The present techniques enable validation of safety critical localization at a required safety integrity level, such as an ASIL level. In some embodiments, hardware or software rated at a lower ASIL level is used to validate hardware or software rated at a higher ASIL level. Validation of the functional safety, e.g. ASIL D, of the localization hardware and software is enabled via processes of a lower ASIL level. Generally, ASIL-D applies to high exposure operational situations (e.g., more than 10% typical operational time) where a malfunction can lead to high severity harm with very low controllability (e.g. less than 90% of average drivers or other traffic participants are able to avoid harm). The localization function is entirely validated according to one or more checkers that operate at a lower ASIL level. The present techniques verify the integrity of the localization output using a simplified safety critical process (e.g., a checker) while enabling the complex localization function to remain non-safety critical. Non-safety critical means that the complex non-safety critical function does not need to conform to the ISO 26262 standard and does not require rigorous safety validation.

Figure 6A:
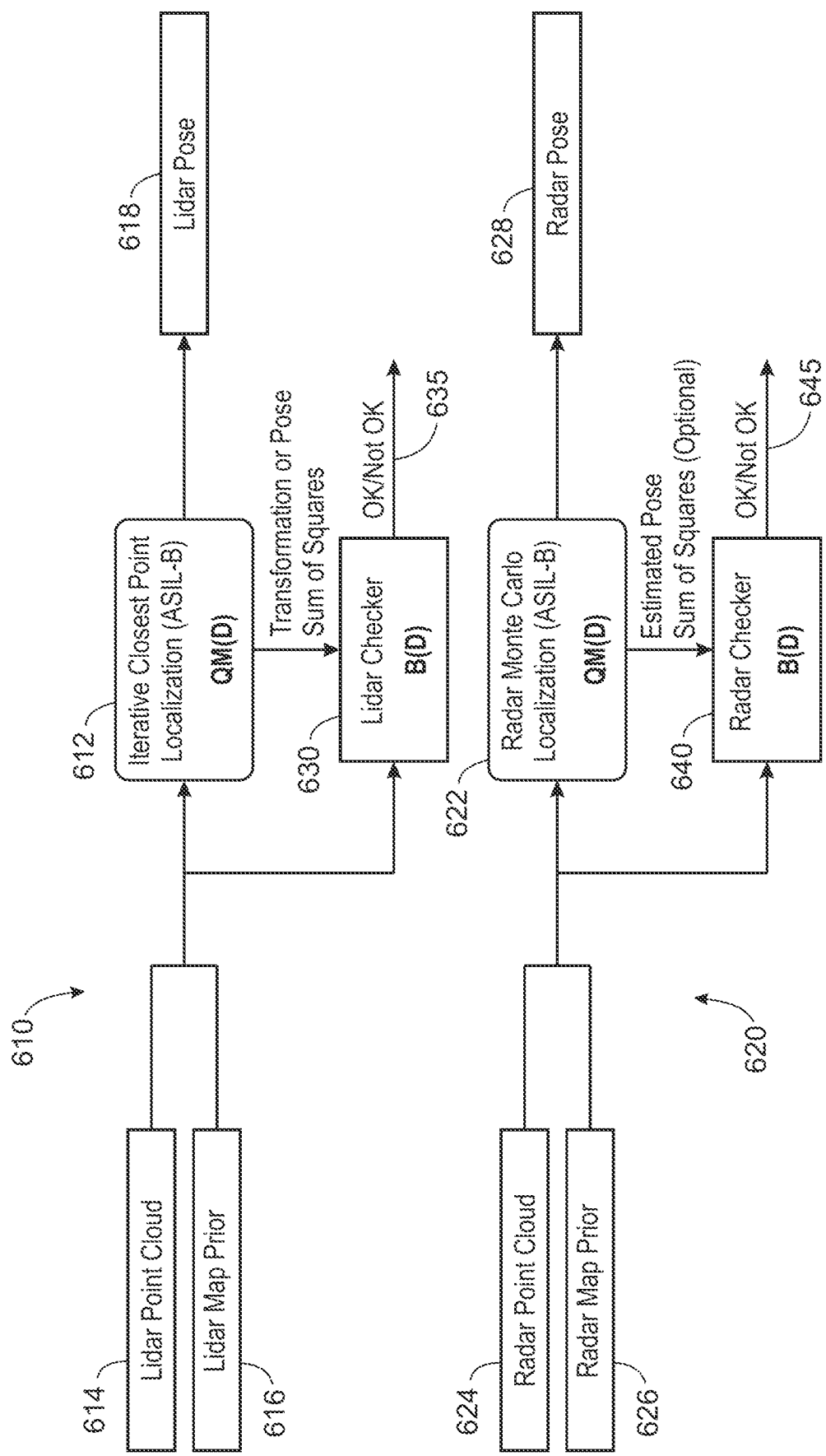
FIG. 6A is a block diagram of a system that shows localization functional safety.

FIG. 6A is a block diagram of a system 600A that shows localized functional safety according to the present techniques. In some embodiments, the system 600A is implemented by one or more systems separate from an AV compute. Additionally, or alternatively, the system 600A can be implemented by one or more systems included in the AV compute 400 illustrated in FIG. 4. Additionally, or alternatively, the system 600A can be implemented in a remote AV system, such as the remote AV system 114 illustrated in FIG. 1.

In embodiments a localization function is validated. In particular, a localization function 612 and a localization function 622 are illustrated. The localization function 612, the localization function 622, or any combinations thereof are components of a localization system 406 as described with respect to FIG. 4. A localization function receives data, such as point cloud data, associated with (e.g., representing) an environment in which the vehicle (e.g., vehicles 102) is located. In the example of FIG. 6, LiDAR based localization functional safety 610 and radar based localization functional safety 620 are illustrated.

In the LiDAR based localization functional safety 610, a LiDAR point cloud 614 is input to the LiDAR localization 612. In examples, the point cloud data is obtained from a LiDAR sensor 202b (FIG. 2). The LiDAR localization 612 also receives as input a LiDAR map prior 616. Generally, the LiDAR map prior 616 is a 2D and/or a 3D map of the environment in which the AV is located. In examples, the environment is a physical environment or a virtual environment. The LiDAR map prior 616 is stored in a database, such as the database 410 (FIG. 4). In examples, the LiDAR localization 612 determines the position of the vehicle in the environment based on a comparison between a point cloud (e.g., LiDAR point cloud 614) and a map (e.g., LiDAR map prior 616). In some embodiments, the LiDAR map prior 616 includes a combined point cloud of the environment, where the combined point cloud is a combination of multiple point clouds associated with the environment. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map point cloud is generated in real-time based on the data received by the perception system.

In some embodiments, the localization function 612 outputs a LiDAR pose 618. In the example of FIG. 6A, the localization function 612 operates according to iterative closest point (ICP) localization at an ASIL-B level. An iterative closest point process uses LiDAR sensor data (e.g., LiDAR point cloud 614) and a map (e.g., LiDAR map prior 616) to calculate the pose that minimizes the squared error between point clouds. ICP localization minimizes a difference between two point clouds. The iterative closest point process is used to reconstruct a 2D or 3D environment in which to localize the AV and achieve optimal path planning. In some embodiments, a transformation is calculated that aligns two point clouds. At each iteration, a correspondence between the source and target point clouds is updated, and the transformation that best aligns them is iteratively determined until convergence is attained. In some embodiments, an iterative closest point process iteratively selects closest corresponding LiDAR points from the LiDAR point cloud 614 and the LiDAR map prior 616 and minimizes a distance between the selected points up to a predetermined threshold value of an error metric.

Figure 6B:
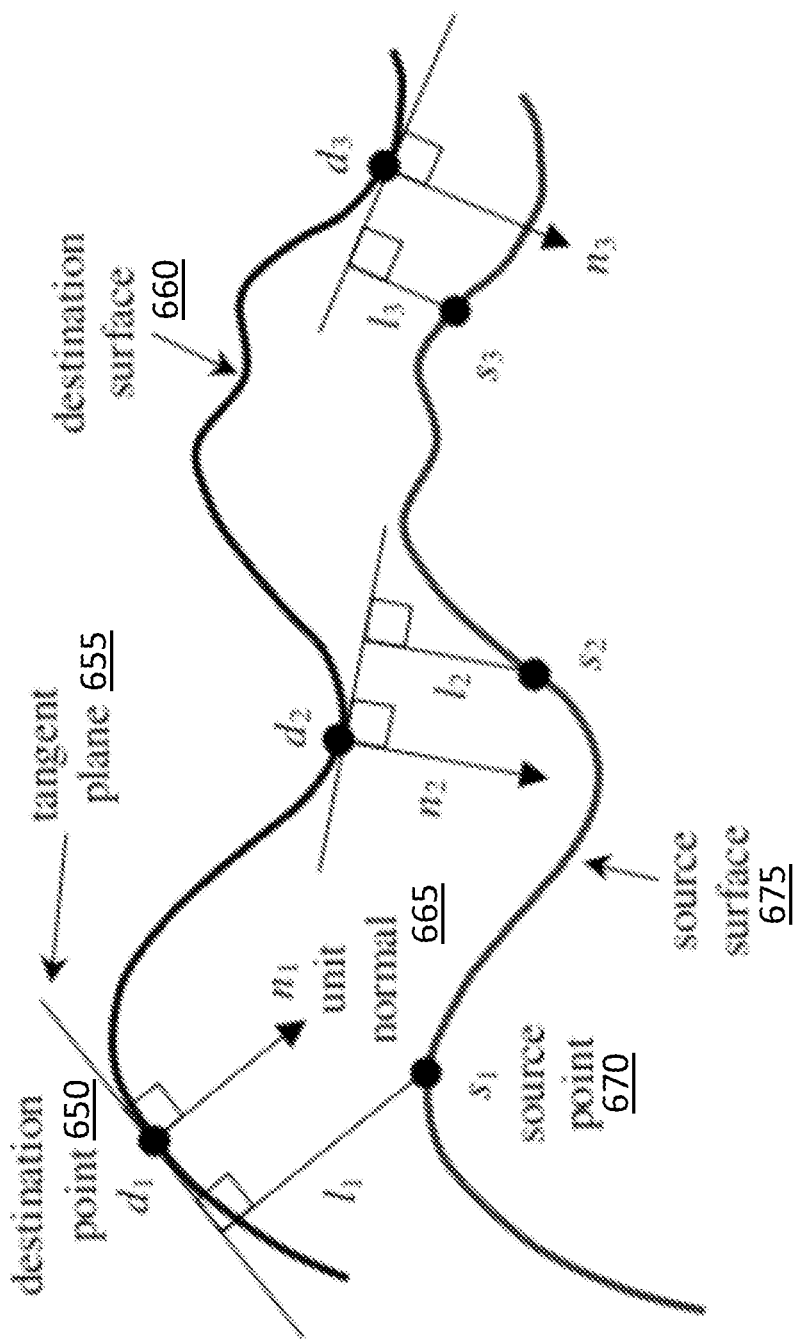
FIG. 6B shows a point-to-plane iterative closest point localization.

FIG. 6B shows a point-to-plane iterative closest point localization 600B. In examples, the LiDAR iterative closest point process uses point-to-plane iterative closest point in conjunction with LiDAR point cloud measurements (e.g., LiDAR point cloud 614) and a prior generated LiDAR point cloud map (e.g., LiDAR map prior) to compute a six degree of freedom pose of the vehicle. The LiDAR point cloud map are divided into tiles of a predefined area with the point cloud organized into a k-d tree with raw point cloud information and the associated pre-computed surface normals included in each node of the k-d tree. The raw point cloud information includes a location (e.g., x,y,z position) and an intensity for points sampled from the environment. In order to determine the pose of the vehicle, the iterative closest point process calculates the transformation necessary to align the raw point cloud information with the prior point cloud map (more specifically, the closest map tile to the estimated pose) that is in a global coordinate frame.

To do so, the point-to-plane ICP process solves the following least squares optimization function:

$$M_{Opt} = \mathrm{argmin}_m \sum_i ((M * s_i - d_i) * n_i)^2$$

where $s_i=(s_{ix}, s_{iy}, s_{iz}, 1)^T$ is a source point; $d_i=(d_{ix}, d_{iy}, d_{iz}, 1)^T$ is the corresponding destination point; $n_i=(n_{ix}, n_{iy}, n_{iz}, 1)^T$ is the unit normal vector 665 at $d_i$ and M and $M_{Opt}$ are 4×4 3D rigid-body transformation matrices. In the example of FIG. 6B, the raw point cloud information is illustrated as a source surface 675, and the map point cloud prior is illustrated as a destination surface 660. The process performs multiple iterations to minimize the sum of the squared distance between each source point 670 and the tangent plane 655 at its corresponding destination point 650, otherwise known as the point-to-plane error metric. In examples, when applied in the context of iterative closest point localization, the source point cloud or surface 675 is a combined LiDAR measurement point cloud generated from captured LiDAR data and the destination point cloud/surface 660 would be the k-d tree queried prior LiDAR map tile with precomputed surface normals.

Referring to both FIGS. 6A and 6B, the checker (e.g., checker 630 of FIG. 6A) determines one or more thresholds to check the error between the scan matching sum of squared error metric from the iterative closest point localization (e.g, localization 612 of FIG. 6A) and a sum of squared error metric from the checker. A flag is set by the checker when the threshold is exceeded. In some embodiments, the flag is transmitted to an AV monitoring system for further processing. In examples, an AV monitoring system is enabled by the autonomous system 202 (FIG. 2). The AV monitoring system observes the status of the AV and can issue alerts or messages associated with the AV status. In some embodiments, the flag can indicate the following possible states: (1) check passes (error within threshold); (2) check failed (due to error exceeding threshold); and (3) check failed (one of expected inputs not received within threshold time limit).

In the example of FIG. 6A, searching and estimating to obtain a set of results (as is done by the localization function 612 and localization function 622) is more complicated and CPU intensive when compared to an evaluation of the results (e.g., checking). As used herein, checking refers to verifying the accuracy of localization output by comparing it with another value. The accuracy of the localization output refers to the localization information being free from errors, mistakes, and being correct. Validation is a determination of if the output is authentic, genuine, or reliable.

A LiDAR checker 630 verifies the accuracy of localization output from the localization function 612 by comparing it with a second error metric calculated by the LiDAR checker 630. In some embodiments, the LiDAR checker 630 enables a doer-checker process that is designed to satisfy ISO26262-related functional Safety requirements by performing software/hardware fault checking via the sampling of a set of outputs from the "doer" process (e.g., localization 612, 622) and evaluating that the checker 630 can reproduce key metrics/components of the "doer." The LiDAR checker 630 receives the same input as the localization function 612. In particular, the localization function 612 receives as input the LiDAR point cloud 614 and the LiDAR map prior 616. The localization function 612 also receives as input transformation or pose sum of squares output by the localization function 612. The LiDAR checker 630 outputs a pass/fail evaluation 635 of the localization function output.

In the example of FIG. 6A, the localization function 612 calculates a first error metric that corresponds to a distance between selected points up to a predetermined threshold value. The first error metric calculated by the localization function 612 is obtained by the LiDAR checker 630 to verify the accuracy of localization output from the localization function 612 by comparing it with a second error metric. In embodiments, the first error metric and the second error metric are a transformation or pose sum of squares. In embodiments, the first metric is a covariance of the transform as applied to the iteratively processed point cloud and map, and the second metric is a covariance of the transform as applied to the source point cloud and the map point cloud. As used herein, the source point cloud is the point cloud provided as input to the localization function and checker. In some embodiments, the checker determines if the first error metric as calculated by the localization function 612 matches the second error metric as calculated by the LiDAR checker 630. The results should match precisely and be below a predefined accuracy threshold.

In an example, the predefined accuracy threshold refers to acceptable accuracy of localization. An acceptable accuracy is determined, for example, by a predetermined distance laterally or longitudinally (e.g., by +/−x cm laterally and +/−y cm longitudinally). This depends of characteristics of vehicle, roads, etc. Additionally, an acceptable accuracy is determined based on characteristics of the LiDAR and point cloud (e.g. number of points, resolution, etc.). Knowing the predetermined distance and characteristics of the LiDAR and point cloud, an acceptable matching threshold (i.e. maximum sum of squared error metric) is selected for the ICP algorithm. In some embodiments, being within the maximum sum of squared error metric satisfies the predefined accuracy threshold.

In some embodiments, iterative closest point localization (e.g., localization 612) outputs a pose that is validated by LiDAR checker 630 to establish ASIL B(D) quality. The LiDAR checker 630 executes a scan matching checker on hardware of ASIL B(D) quality. The LiDAR checker 630 takes as input a LiDAR map prior 616, a LiDAR point cloud 614, as well as a pose output by the localization 612. The residual sum of squares error, covariance, or any combinations thereof are calculated by the LiDAR checker using a modified iterative closest point algorithm and then compared to the output of an original iterative closest point algorithm executing on hardware at a QM(D) quality.

In examples, the LiDAR based localization functional safety executes according to the follow equations:

$$r_{ICP,final} = \Sigma_{i=1}^{N_S} ((M_{Opt,final} * s_i - d_i) * n_i)^2 \quad (1)$$

$$r_{Checker} = \Sigma_{i=1}^{N_S} ((M_{Opt,final} * s_i - d_i) * n_i)^2 \quad (2)$$

$$F_{ICP} = |r_{ICP,final} - r_{Checker}| < \gamma \quad (3)$$

Where $r_{ICP,final}$ is the defined point-to-plane error metric provided by the iterative closest point localization 612; $r_{Checker}$ is the defined point-to-place error metric reproduced by the checker module; $F_{ICP}$ is a Boolean flag set by detection of error exceeding the pre-defined threshold indicating a fault (e.g., a functional safety fault according to a predefined standard); and y is a threshold value normalized proportionally to $N_C$. Additionally, $N_C$ is the number of correspondences and $C=\{c_i\}$ is the set of correspondences where $c_i=<c_s, c_i>$; $N_S$ is the number of points in the source point cloud and $S=\{s_i\}$ is the set of source points where $s_i=(s_{ix}, s_{iy}, s_{iz}, 1)^T$; $N_D$ is the number of points in the destination point cloud and $D=\{d_i\}$ is the set of source points where $d_i=(d_{ix}, d_{iy}, d_{iz}, 1)^T$; $M_{Opt}$ is the final iteration/locally optimal solution for the S to D point cloud transformation, represented as a 4×4 3D rigid-body transformation matrix.

In some embodiments, the checker 630 reproduces a point-to-plane error metric (within a predefined threshold) generated from the scan performed during iterative closest point localization on a ASIL B certified compute platform using outputs of the localization function 612 as well as the LiDAR point cloud 614 and prior LiDAR map tile point clouds 616. To do this, the checker 630 consumes the final iteration pose transformation output from the point-to-plane ICP localization process of the localization function 612 as well as the iteration's point-to-plane residual error and the final correspondences. Next, the key error metric is reproduced by applying the final computed transform to the source point cloud (the LiDAR measurement) via M and recalculating the sum of the squared distance between $M_{Opt}*S$ each source point and the tangent plane at its corresponding destination point (from the prior LiDAR map tile as queried using the index output from the ICP task) via Equation (2). This is compared to the point-to-plane error metric generated by the localization function 612 in Equation (1), and a fault flag would be raised to the an AV monitoring process if the error between the two metrics exceeded a predetermined threshold as obtained in Equation (3).

In some cases, the checker 630 as described with respect to a LiDAR is replicated on a secondary localization function. Thus, in the radar based localization functional safety 620, a radar point cloud 624 is input to the radar localization 622. In examples, the point cloud data is obtained from a radar sensor 202c (FIG. 2). The radar localization 622 also receives as input a radar map prior 626. Generally, the radar map prior 626 is a 2D and/or a 3D map of the environment in which the AV is located. In examples, the environment is a physical environment or a virtual environment. The radar map prior 626 is stored in a database, such as the database 410 (FIG. 4). In examples, the radar localization 622 determines the position of the vehicle in the area based on a comparison between a point cloud (e.g., radar point cloud 624) and a map (e.g., radar map prior 626). In some embodiments, the radar map prior 626 includes a combined point cloud of the environment.

In some embodiments, the localization function 622 outputs a radar pose 628. In the example of FIG. 6, the localization function 622 operates according to Monte Carlo localization at an ASIL-B level. A Monte Carlo localization uses a radar point cloud 624 and a radar map prior 626 to iteratively update the pose using Bayesian updating, wherein the Bayesian updating is a statistical inference using Bayes' theorem to update a probable position and orientation of the vehicle as more evidence or information becomes available. Monte Carlo localization estimates a position and an orientation of the AV as it navigates and senses the environment. A particle filter represents the distribution of likely states, with each particle representing a possible state, e.g., a hypothesis of the AV location. Monte Carlo localization is initialized with a uniform random distribution of particles over the configuration space, meaning the AV has no information about where it is and assumes it is equally likely to be at any point in space. Whenever the AV moves, it shifts the particles to predict its new state after the movement. Whenever the AV observes an object, the particles are resampled based on recursive Bayesian estimation, e.g., how well the actual sensed data correlate with the predicted state. The particles ultimately converge towards the actual position of the AV. In examples, Monte Carlo localization is improved by sampling the particles in an adaptive manner based on an error estimate using the Kullback-Leibler divergence. In some embodiments, Monte Carlo localization is determined without the calculation of an error metric.

In some embodiments the radar based localization functional safety 620 is a secondary localization pipeline. Similar to the LiDAR based localization functional safety 610, a radar checker 640 verifies the accuracy of localization output from the localization function 622 by comparing it with a second error metric calculated by the radar checker 640. The radar checker 640 receives the same input as the localization function 622. In particular, the localization function 622 receives as input the radar point cloud 624 and the radar map prior 626. In some embodiments, the radar point cloud 624 is a source point cloud. The radar checker 640 also receives as input an estimated pose output by the localization function 622. In examples, the radar checker 640 receives as input a second error metric, such as the sum of squares. The radar checker 640 outputs a pass/fail evaluation 645 of the localization function output.

In the example of FIG. 6A, the localization function 622 calculates a distribution of likely states of the AV as it navigates through the environment represented by particles. The estimated pose calculated by the localization function 622 is obtained by the radar checker 640 to verify the accuracy of localization output from the localization function 622 by determining a first error metric and comparing it with a second error metric. In embodiments, the first error metric and the second error metric are a transformation or pose sum of squares. In embodiments, the first metric is a covariance of the transform as applied to the iteratively processed point cloud and map, and the second metric is a covariance of the transform as applied to the source point cloud and the map point cloud. In embodiments, the radar checker 640 calculates a first error metric as sum of squares based on an estimated pose output by the localization function 622. The radar checker 640 calculates a second error metric as a sum of squares based on the radar point cloud 624 and the radar map prior 626 as input. In an embodiment, the localization function 622 determines a first error metric based on using the Kullback-Leibler divergence, and the checker determines if the first error metric as calculated by the localization function 622 matches a second error metric as calculated by the radar checker 640. In an embodiment, the radar checker 640 determines if the first error metric as calculated from the estimated pose output by the localization function 622 matches the second error metric as calculated by the radar checker 640. The results are compared to a predefined accuracy threshold.

In some embodiments, the checker 640 outputs a secondary (Map) pose that is validated by a secondary (Map) checker to ensure ASIL B(D) quality. Validation by the secondary (Map) checker is performed by executing a simplified version of the secondary (Map) localization process on the secondary (Map) checker (e.g., checker 640) executing at ASIL B(D) quality. The secondary (Map) checker takes as input the secondary map, secondary sensor measurement, as well as the secondary (Map) pose from the original iterative closest point localization algorithm. The residual sum squares error is calculated (and or the covariance) by the LiDAR checker 630 with its modified iterative closest point algorithm and then compared to the original localization secondary (Map) algorithm (running on QM(D) core). In some embodiments, the pose output flow is as follows: Doer>pose>Checker>pose>Consumers. This ensures that a bad pose is not provided to consumers, where consumers represent users, software, or hardware that obtains poses from a localization function.

In embodiments, the localization function 612 and the localization function 622 meet ASIL-B safety standards for a level 4 or higher autonomous vehicle. In particular, the localization function 612 and the localization function 622 comply with functional safety requirements (e.g., meet ASIL-B safety standards) while executing on QM compute hardware. The functional safety is enabled via one or more checker functions that operate at a higher ASIL level. In some embodiments, the LiDAR checker 630 and radar checker 640 enable independent evaluation of respective localization functions of an AV compute. Traditionally, localization functions are designed for functional safety by carefully analyzing the function and adding diagnostics, redundancies, etc. However, this can be challenging for a number of reasons, such as high computational requirements, complex algorithms, and dependencies on uncertified libraries. The present techniques enable checking independently from the core localization function.

Through the independent LiDAR checker 630 and radar checker 640, safety levels associated with AV hardware and software can be decomposed to enable subsystems with varying ASIL levels. In examples, a lower ASIL level is implemented on the more complex localization algorithms and third party libraries. The complex localization algorithms and third party libraries are executed on non-safety critical hardware and software. In examples, the lower ASIL level is a QM level. The computationally less complex checker (when compared to complex localization algorithms) executes at a higher ASIL level (e.g., ASIL A-D). ISO 26262 enables decomposition of ASIL requirements into redundant subsystems, provided each subsystem can satisfy the requirement and the subsystems are sufficiently independent. In some examples, a two-layer decomposition is implemented where the ASIL D localization function is decomposed into independent Lidar localization function at ASIL B(D) and Radar localization function at B(D). For example, each of these functions is further decomposed into a Doer function at QM(D) and a Checker function at B(D). In other examples, a single localization function is implemented, and one-layer decomposition is applied. For example, a single ASIL D Lidar localization function could be decomposed into a QM(D) Doer and a D(D) Checker. The decomposed ASIL levels across the AV compute enables quicker satisfaction and validation of ASIL levels while ensuring compliance with safety standards as dictated by the prescribed ASIL ratings. The present techniques reduce the computation load on safety critical computers (e.g., hardware and software), increasing efficiency of the system. Moreover, the present techniques can be implemented on any point cloud (e.g., LiDAR, radar) matching algorithm, including Iterative Closest Point and Monte Carlo Localization. In some embodiments, output of the checker (e.g., checker 630 and checker 640) is provided to an AV monitoring system to enable robust, real-time fault detection.

In some embodiments, the two localization functions (e.g., localization 612 and localization 622) execute simultaneously. In some embodiments, two different localization functions are not necessary for the checker solution. In some embodiments, redundant localization (e.g., multiple localization functions) because it enables decomposition of the safety goal from D=B(D)+B(D). As a result, each localization function is ASIL B(D). Additionally, redundant localization provides robustness to different environment conditions where LiDAR or radar may perform poorly. In some embodiments, the present techniques are based on LiDAR or radar localization, independently. The independent localization function (LiDAR or radar doer) remains at a level of QM, and the checker is at a level of ASIL D. There would also not be a need for arbitration since there would be one checker.

In examples, each of the LiDAR point cloud 614 and radar point cloud 624 are cross-checked prior to input to a localization function 612, 622, respectively. For example, a LiDAR point cloud is obtained from a first LiDAR sensor. Information from other LiDAR sensors of the vehicle is used to cross-check the accuracy of the LiDAR point cloud from the first LiDAR sensor. For example, data captured by a first, 360-degree field of view LiDAR is cross-checked with data captured by at least one short range LiDAR. For ease of description, two LiDARs are described, however any number of LiDARs can be used. In embodiments, locations associated with data captured by the first, 360-degree field of view LiDAR overlaps with locations associated with data captured by at least one short range LiDAR. The overlapping data across LiDAR sensors is used to cross-check the 360-degree point cloud used for localization. As a result, in embodiments the LiDAR point cloud 614 is a 360-degree cross-checked LiDAR point cloud 614. Cross-checking is, for example, a plausibility or consistency check of data captured by redundant systems, sensors, or devices. The cross-checking provides a confidence in the LiDAR point cloud 614 input to the localization 612. Similarly, in examples a radar point cloud is obtained from a first radar. Information from other radars of the vehicle is used to cross-check the accuracy of the radar point cloud from the first radar sensor, and the cross-checking provides a confidence in the radar point cloud 624 input to the localization 622.

The block diagram of FIG. 6A is not intended to indicate that the system 600A is to include all of the components shown in FIG. 6A. Rather, the system 600A can include fewer or additional components not illustrated in FIG. 6A (e.g., additional localization functions, checkers, inputs, outputs, etc.). The system 600A may include any number of additional components not shown, depending on the details of the specific implementation. Furthermore, any of the functionalities of the user interfaces may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 7:
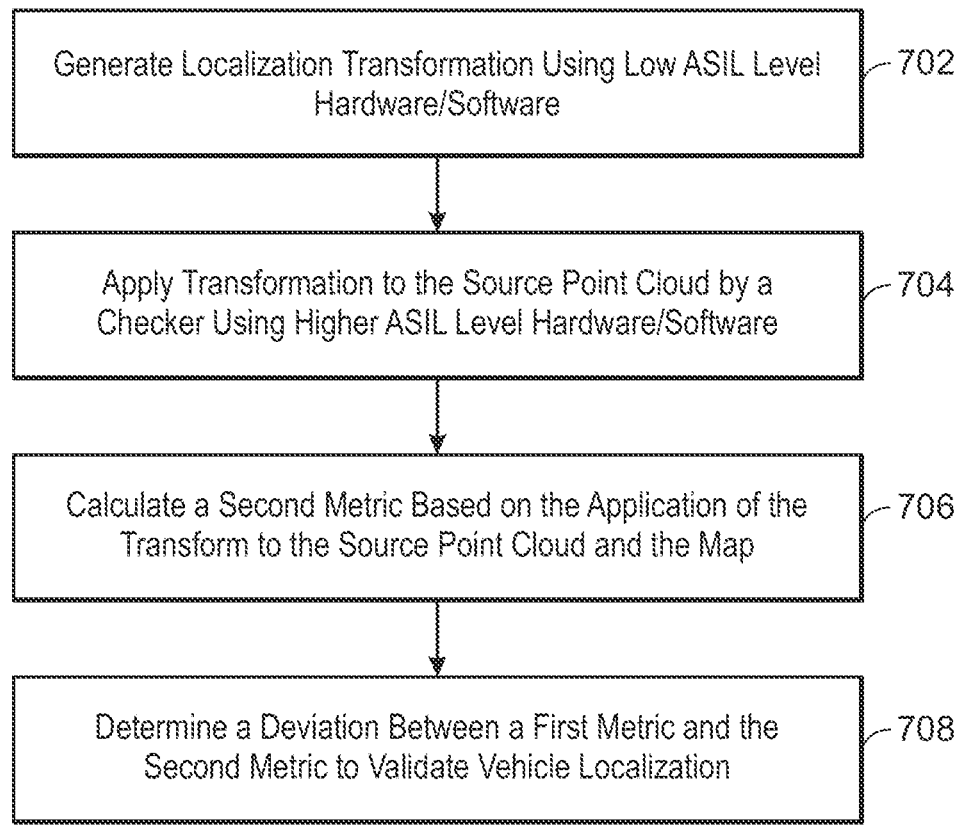
FIG. 7 is a block diagram of a process that enables localization functional safety.

FIG. 7 is a block diagram of a process 700 that enables localization functional safety. The process 700 may be performed at using the autonomous vehicle compute 400 of FIG. 4 in an environment 100 of FIG. 1. In examples, a checker (e.g., LiDAR checker 630 and radar checker 640) is implemented using components of the vehicle 200 of FIG. 2, the device 300 of FIG. 3. In some embodiments, the process 700 is implemented by one or more systems separate from an AV compute. Additionally, or alternatively, the process 700 can be implemented in a remote AV system, such as the remote AV system 114 illustrated in FIG. 1.

In some embodiments, a device (e.g., LiDAR 202b, radar 202c of FIG. 2) is configured to capture data associated with light reflected from objects (e.g., other vehicles, pedestrians, street sights, etc.) in an environment. In some embodiments, the captured raw data is electromagnetic radiation in the ultraviolet, infrared, or laser spectra, or any other kind of electromagnetic radiation. A source point cloud is generated based on the reflected light. The source point cloud is iteratively processed according to vehicle localization. As described herein, localization functions include, but are not limited to, iterative closest point localization, Monte Carlo localization, and the like. Localization functions are used to calculate a transform between the iteratively processed point cloud and a map associated with a first pose. The localization functions execute via hardware and software at a QM(D) ASIL level.

At block 702, a localization transformation is generated. In some embodiments, a first metric associated with vehicle localization based on the transform is calculated by the localization function and used for comparison by the corresponding checker function. In some embodiments, a first metric associated with vehicle localization based on the transform is calculated by the checker function based on the output of the localization function. The calculated first metric is used for comparison by the corresponding checker function.

In the example of FIG. 7, at block 704 the transform is applied to the source point cloud by a checker algorithm or process. The checker process executes via hardware and software at a higher ASIL level, such as ASIL-B(D). In some embodiments, the checker process executes at a higher ASIL level when compared to an ASIL level of the corresponding localization function. As used herein, the corresponding localization function is the localization function being checked by the checker.

At block 706, a second metric is calculated based on the application (e.g., applying) of the transform to the source point cloud and the map point cloud at block 704. In some embodiments, the first metric and the second metric are sum of squared errors. In some embodiments, the first metric is a covariance of the transform as applied to the iteratively processed point cloud and map, and the second metric is a covariance of the transform as applied to the source point cloud and the map point cloud. In some embodiments, a transform is applied to the source point cloud to generate a second pose, and the second pose is validated prior to calculating the second metric. In examples, the second pose is generated by executing a simplified version of the localization function at the checker running on ASIL B(D) hardware and a secondary map. In this example, the input to the checker is a secondary map, secondary point cloud, as well as the secondary pose from the original ICP. In some embodiments, the initial calculation of the transform and the first metric are an iterative semi-random search. The second metric does not involve any search.

At block 708, a deviation between the first metric and the second metric is determined. In some embodiments, the vehicle localization is validated when the deviation is less than a predetermined threshold. In embodiments, the deviation between the first metric and the second metric is monitored, and a deviation that exceeds the predetermined threshold is indicative of a malfunction. In embodiments, a malfunction is a hardware failure (e.g., system, sensors or devices), fault, or software failure (e.g., systematic software failure). In some embodiments, actions are taken in response to the malfunction. For example, the vehicle safely halts navigation, such as by navigating to a location and preventing further navigation. The vehicle can issue alerts or notifications to other vehicles. Additionally, the actions include use of vehicle assistance, such as a remote AV system 114, fleet management system 116, or V2I infrastructure system 118 of FIG. 1, to enable navigation of the vehicle when a malfunction occurs. For example, vehicle assistance provides remedial actions to eliminate the malfunction. This can include, for example, resetting sensors. The vehicle assistance can also provide data to the vehicle for use in further navigation.

In some embodiments, a plausibility of vehicle localization is determined prior to iteratively processing the point cloud data to determine the localization transformation. The plausibility refers to a series of plausibility checks wherein a range, rate, and time duration are evaluated in view of predetermined thresholds. In some examples, the checker provides thresholds to conduct a plausibility check of the range of each localization output for each localization cycle. The following thresholds can be evaluated independently or in combination to determine the plausibility of the vehicle localization. For example, a first threshold provides that a translational distance between poses shall not exceed a distance that is a function of a first predetermined value, such as velocity with a calibration buffer according to a checker sample time, or [$Velocity_{net,\ Max\ ODD}$+CalibrationBuffer]*Checker Sample Time. Additionally, a second threshold provides that the rotational distance between poses shall not exceed the a distance that is a function of a second predetermined value, such as the angular velocity with a calibration buffer according to a checker sample time, or [$Angular\ Velocity_{net,x\ Veh}$+CalibrationBuffer]*Checker Sample Time. In some examples, the checker provides threshold to conduct a plausibility check of the rate of change for each localization output for each localization cycle. For example, a third threshold provides that a change in translational velocity shall not exceed a velocity that is a function of a third predetermined value, such as acceleration with a calibration buffer according to a checker sample time, or [$Accel_{Net,\ Max\ ODD}$+CalibrationBuffer]*Checker Sample Time=Delta $Velocity_{Threshold}$. Additionally, a fourth threshold provides that the translational velocity shall not exceed a velocity that is a function of a fourth predetermined value, such as velocity with a calibration buffer, or [$Velocity_{net,\ Max\ ODD}$+CalibrationBuffer].

In some examples, the checker checks for the duration of time of the detected error of the system for each task cycle. If the detected error time duration occurs for less than a predetermined number of milliseconds (or a predetermined number of localization cycles) a localization checker flag indicates that the localization passes or is healthy. In some examples, the checker checks for the duration of time of the detected faulted flag of each task for each task cycle. If the detected error time duration occurs for less than a predetermined number of milliseconds (or a predetermined number of localization cycles) the localization checker flag indicates that the localization passes or is heathy.

In some examples, the checker checks for the duration of time since each of the flag message inputs were received. For each respective flag message input, if the duration of time since the input was received exceeds a predetermined number of localization cycles, the localization checker flag indicates that the localization fails or is faulted. In some examples, the checker shall check for convergence of the gyroscope/accelerometer bias. If the gyroscope/accelerometer bias does not converge within a predetermined number of localization cycles, the localization checker flag indicates that the localization fails or is faulted.

In some examples, the checker performs robust statistical fault detection for a smoothed pose output of the localization function via an analysis of the sample standard errors from the estimator with respect to the set alert limits and protection limits. If the localization error exceeds the set alert limits, the localization checker flag is set as degraded. For example, there may be a range of accuracies for localization:

<- - -Typical Perf+/−2 cm 90% of time- - ->
<- - -Target Perf+/−2.5 cm 95% of time- - - - ->
<- - - -Alert Perf+/−4 cm 99.9% of time- - - - - - - ->
<- - - - -Unsafe Perf+/−10 cm 99.999% of time- - - ->

The numbers provided in the example above are exemplary and should not be viewed as limiting. In examples, an alert indicates that the pose/match is outside of target performance but is not yet hazardous. This could be logged, used to notify an operation center, etc. The unsafe limit is used to set the checker output to "not ok" and start safety mitigations (e.g. a safe stop).

CLAUSES

According to some non-limiting embodiments or examples, provided is a system, comprising: at least one processor, and at least one non-transitory storage media storing instructions that, when executed by the at least one processor, cause the at least one processor to generate a source point cloud, wherein source point cloud data is iteratively processed according to vehicle localization. The instructions cause the at least one processor to calculate a transform between the iteratively processed source point cloud and a map associated with a first pose. The instructions cause the at least one processor to calculate a first metric associated with vehicle localization based on the transform. The instructions cause the at least one processor to apply the transform to the source point cloud, and calculate a second metric based on the application of the transform to the source point cloud and a map point cloud. Additionally, the instructions cause the at least one processor to determine a deviation between the first metric and the second metric, wherein the vehicle localization is validated when the deviation is less than a predetermined threshold.

According to some non-limiting embodiments or examples, provided is a method, comprising generating, with at least one processor, a source point cloud, wherein source point cloud data is iteratively processed according to vehicle localization. The method includes calculating, with the at least one processor, a transform between the iteratively processed source point cloud and a map associated with a first pose. The method includes calculating, with the at least one processor, a first metric associated with vehicle localization based on the transform. The method also includes applying, with the at least one processor, the transform to the source point cloud, and calculating, with the at least one processor, a second metric based on the application of the transform to the source point cloud and a map point cloud. Additionally, the method includes determining, with the at least one processor, a deviation between the first metric and the second metric, wherein the vehicle localization is validated when the deviation is less than a predetermined threshold.

According to some non-limiting embodiments or examples, provided is at least one non-transitory computer-readable medium comprising one or more instructions that, when executed by at least one processor, cause the at least one processor to generate a source point cloud, wherein source point cloud data is iteratively processed according to vehicle localization. The instructions cause the at least one processor to calculate a transform between the iteratively processed source point cloud and a map associated with a first pose. The instructions cause the at least one processor to calculate a first metric associated with vehicle localization based on the transform. The instructions also cause the at least one processor to apply the transform to the source point cloud, and calculate a second metric based on the application of the transform to the source point cloud and a map point cloud. Additionally, the instructions cause the at least one processor to determine a deviation between the first metric and the second metric, wherein the vehicle localization is validated when the deviation is less than a predetermined threshold.

Further non-limiting aspects or embodiments are set forth in the following numbered clauses:

Clause 1: A system, comprising: at least one processor, and at least one non-transitory storage media storing instructions that, when executed by the at least one processor, cause the at least one processor to: generate a source point cloud, wherein source point cloud data is iteratively processed according to vehicle localization; calculate a transform between the iteratively processed source point cloud and a map associated with a first pose; calculate a first metric associated with vehicle localization based on the transform; apply the transform to the source point cloud; calculate a second metric based on the application of the transform to the source point cloud and a map point cloud; and determine a deviation between the first metric and the second metric, wherein the vehicle localization is validated when the deviation is less than a predetermined threshold.

Clause 2: The system of claim 1, wherein vehicle localization is executed via an AV compute at an automotive safety integrity level (ASIL) of quality managed (QM) D.

Clause 3: The system of any of claim 1 or 2, wherein the first metric and the second metric are sum of squared errors.

Clause 4: The system of any of claims 1-3, wherein the first metric is a covariance of the transform as applied to the iteratively processed point cloud and map, and the second metric is a covariance of the transform as applied to the source point cloud and the map point cloud.

Clause 5: The system of any of claims 1-4, wherein the instructions further comprise monitoring the deviation between the first metric and the second metric, wherein a deviation that exceeds the predetermined threshold is indicative of a malfunction.

Clause 6: The system of any of claims 1-5, wherein the instructions further comprise determining a plausibility of vehicle localization prior to iteratively processing the point cloud data.

Clause 7: The system of any of claims 1-6, wherein the instructions further comprise applying the transform to the source point cloud to generate a second pose, wherein the second pose is validated prior to calculating the second metric.

Clause 8: The system of any of claims 1-7, wherein the vehicle localization is iterative closest point localization.

Clause 9: The system of any of claims 1-7, wherein the vehicle localization is Monte Carlo localization.

Clause 10: A method comprising: generating, with at least one processor, a source point cloud, wherein source point cloud data is iteratively processed according to vehicle localization; calculating, with the at least one processor, a transform between the iteratively processed source point cloud and a map associated with a first pose; calculating, with the at least one processor, a first metric associated with vehicle localization based on the transform; applying, with the at least one processor, the transform to the source point cloud; calculating, with the at least one processor, a second metric based on the application of the transform to the source point cloud and a map point cloud; and determining, with the at least one processor, a deviation between the first metric and the second metric, wherein the vehicle localization is validated when the deviation is less than a predetermined threshold.

Clause 11: The method of claim 10, wherein the vehicle localization is executed via an AV compute at an automotive safety integrity level (ASIL) of quality managed (QM) D.

Clause 12: The method of any of claim 10 or 11, wherein the first metric and the second metric are sum of squared errors.

Clause 13: The method of any of claims 10-12, wherein the first metric is a covariance of the transform as applied to the iteratively processed point cloud and map, and the second metric is a covariance of the transform as applied to the source point cloud and the map point cloud.

Clause 14: The method of any of claims 10-13, comprising monitoring the deviation between the first metric and the second metric, wherein a deviation that exceeds the predetermined threshold is indicative of a malfunction.

Clause 15: The method of any of claims 10-14, comprising determining a plausibility of method localization prior to iteratively processing the point cloud data.

Clause 16: The method of any of claims 10-15, comprising applying the transform to the source point cloud to generate a second pose, wherein the second pose is validated prior to calculating the second metric.

Clause 17: The method of any of claims 10-16, wherein the vehicle localization is iterative closest point localization.

Clause 18: The method of any of claims 10-16, wherein the vehicle localization is Monte Carlo localization.

Clause 19: At least one non-transitory storage media storing instructions that, when executed by at least one processor, cause the at least one processor to: generate a source point cloud, wherein source point cloud data is iteratively processed according to vehicle localization; calculate a transform between the iteratively processed source point cloud and a map associated with a first pose; calculate a first metric associated with vehicle localization based on the transform; apply the transform to the source point cloud; calculate a second metric based on the application of the transform to the source point cloud and a map point cloud; and determine a deviation between the first metric and the second metric, wherein the vehicle localization is validated when the deviation is less than a predetermined threshold.

Clause 20: The at least one non-transitory storage media of claim 19, wherein the vehicle localization is executed via an AV compute at an automotive safety integrity level (ASIL) of quality managed (QM) D.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one processor, and
   at least one non-transitory storage media storing instructions that, when executed by the at least one processor, cause the at least one processor to:
   generate a source point cloud, wherein source point cloud data is iteratively processed according to vehicle localization;
   calculate a transform between the iteratively processed source point cloud data and a map associated with a first pose;
   calculate a first metric associated with vehicle localization based on the transform;
   apply the transform to the iteratively processed source point cloud data;
   calculate a second metric based on the application of the transform to the source point cloud and the map associated with the first pose; and
   determine a deviation between the first metric and the second metric, wherein the vehicle localization is validated when the deviation is less than a predetermined threshold.

2. The system of claim 1, wherein vehicle localization is executed via an AV compute at an automotive safety integrity level (ASIL) of quality managed (QM) D.

3. The system of claim 1, wherein the first metric and the second metric are sum of squared errors.

4. The system of claim 1, wherein the first metric is a covariance of the transform as applied to the iteratively processed point cloud and map, and the second metric is a covariance of the transform as applied to the source point cloud and the map point cloud.

5. The system of claim 1, wherein the instructions further comprise monitoring the deviation between the first metric and the second metric, wherein a deviation that exceeds the predetermined threshold is indicative of a malfunction.

6. The system of claim 1, wherein the instructions further comprise determining a plausibility of vehicle localization prior to iteratively processing the point cloud data.

7. The system of claim 1, wherein the instructions further comprise applying the transform to the source point cloud to generate a second pose, wherein the second pose is validated prior to calculating the second metric.

8. The system of claim 1, wherein the vehicle localization is iterative closest point localization.

9. The system of claim 1, wherein the vehicle localization is Monte Carlo localization.

10. A method comprising:
    generating, with at least one processor, a source point cloud, wherein source point cloud data is iteratively processed according to vehicle localization;
    calculating, with the at least one processor, a transform between the iteratively processed source point cloud data and a map associated with a first pose;
    calculating, with the at least one processor, a first metric associated with vehicle localization based on the transform;
    applying, with the at least one processor, the transform to the iteratively processed source point cloud data;
    calculating, with the at least one processor, a second metric based on the application of the transform to the source point cloud and the map associated with the first pose; and
    determining, with the at least one processor, a deviation between the first metric and the second metric, wherein the vehicle localization is validated when the deviation is less than a predetermined threshold.

11. The method of claim 10, wherein the vehicle localization is executed via an AV compute at an automotive safety integrity level (ASIL) of quality managed (QM) D.

12. The method of claim 10, wherein the first metric and the second metric are sum of squared errors.

13. The method of claim 10, wherein the first metric is a covariance of the transform as applied to the iteratively processed point cloud and map, and the second metric is a covariance of the transform as applied to the source point cloud and the map point cloud.

14. The method of claim 10, comprising monitoring the deviation between the first metric and the second metric, wherein a deviation that exceeds the predetermined threshold is indicative of a malfunction.

15. The method of claim 10, comprising determining a plausibility of vehicle localization prior to iteratively processing the source point cloud data.

16. The method of claim 10, comprising applying the transform to the source point cloud to generate a second pose, wherein the second pose is validated prior to calculating the second metric.

17. The method of claim 10, wherein the vehicle localization is iterative closest point localization.

18. The method of claim 10, wherein the vehicle localization is Monte Carlo localization.

19. At least one non-transitory storage media storing instructions that, when executed by at least one processor, cause the at least one processor to:
    generate a source point cloud, wherein source point cloud data is iteratively processed according to vehicle localization;
    calculate a transform between the iteratively processed source point cloud data and a map associated with a first pose;
    calculate a first metric associated with vehicle localization based on the transform;
    apply the transform to the iteratively processed source point cloud data;
    calculate a second metric based on the application of the transform to the source point cloud and the map associated with the first pose; and
    determine a deviation between the first metric and the second metric, wherein the vehicle localization is validated when the deviation is less than a predetermined threshold.

20. The at least one non-transitory storage media of claim 19, wherein the vehicle localization is executed via an AV compute at an automotive safety integrity level (ASIL) of quality managed (QM) D.

* * * * *